United States Patent
Rotsch et al.

(10) Patent No.: US 6,332,603 B1
(45) Date of Patent: Dec. 25, 2001

(54) METHOD FOR CONTROLLING AN ENGINE SUPPORT

(75) Inventors: Karl Rotsch, Markt Indersdorf (DE); Rainer Pollhammer, Linz (AT); Norbert Peters, Stuttgart (DE); Felix Schramm, Munich (DE); Thomas Kafer, Landsberg (DE); Steffen Löschner, Olching (DE); Horst Flechtner, Garching (DE); Hans Heltmann, Grossaitingen (DE); William Mark Horne, Conventry (GB)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/462,661
(22) PCT Filed: Jul. 8, 1998
(86) PCT No.: PCT/EP98/04215
§ 371 Date: Jun. 28, 2000
§ 102(e) Date: Jun. 28, 2000
(87) PCT Pub. No.: WO99/02886
PCT Pub. Date: Jan. 21, 1999

(30) Foreign Application Priority Data

Jul. 12, 1997 (DE) .............................. 197 29 980

(51) Int. Cl.⁷ .................................................... F16M 9/00
(52) U.S. Cl. ...................... 267/140.11; 267/136; 188/378
(58) Field of Search ............................... 267/136, 140.11, 267/140.12, 140.13, 140.14, 140.15, 141.2; 188/378, 379, 380, 266, 267, 267.1, 267.2; 248/637, 638, 562, 563

(56) References Cited

U.S. PATENT DOCUMENTS

| 3,483,951 | 12/1969 | Bonesho et al. . |
| 4,852,245 | * 8/1989 | Denk ........................................ 29/596 |
| 4,921,272 | 5/1990 | Ivers . |
| 5,145,024 | * 9/1992 | Doi .................................... 188/267 X |
| 5,628,499 | 5/1997 | Ikeda et al. . |
| 5,944,297 | * 8/1999 | Flower et al. ........................ 248/638 |

FOREIGN PATENT DOCUMENTS

| 3910447A1 | 10/1989 | (DE) . |
| 3932064A1 | 4/1990 | (DE) . |
| 4021039 | 1/1992 | (DE) . |
| 4120099A1 | 1/1992 | (DE) . |
| 4123254A1 | 1/1993 | (DE) . |
| 4233212A1 | 4/1994 | (DE) . |
| 88111681 | 1/1989 | (EP) . |
| 93103332 | 9/1993 | (EP) . |
| 2660386 | 10/1991 | (FR) . |

* cited by examiner

Primary Examiner—Pam Rodriguez
(74) Attorney, Agent, or Firm—Crowell & Moring LLP

(57) ABSTRACT

Assembly mounts are stochastically or periodically detuned by changing their spring rate in order to prevent the transient effect of stuttering vibration of the drive assembly of a motor vehicle. The adjustment of the spring rate by at least a factor of 5 takes place for a time period which corresponds to no more than one fifth of the vibration duration of the stuttering movement.

10 Claims, 3 Drawing Sheets

METHOD FOR CONTROLLING AN ENGINE SUPPORT

BACKGROUND OF THE INVENTION

1. Field of the Invention

The invention relates to a process for controlling an assembly mount.

2. Discussion of Background

From German Patent Document DE 40 21 039 C2, a hydraulically damping assembly mount for an internal-combustion engine is known. The mount is designed such that vibrations of the internal-combustion engine resulting from gas forces and inertial forces are uncoupled from the vehicle body. In the event of low-frequency relative movements of the assembly with respect to the vehicle body, an overflow mechanism becomes effective in the mount, which overflow mechanism connects the two fluid chambers of the assembly mount with one another and, as the result of the friction losses of the overflowing fluid, causes an additional damping of these vibrations.

Furthermore, assembly mounts are known whose spring rate can be changed for an adaptation to certain operating conditions of the assembly (such as idling).

SUMMARY OF THE INVENTION

It is an object of the invention to provide a process for controlling an assembly mount, by means of which low-frequency natural vibrations of the assembly can be counteracted in a targeted and effective manner, without any negative influence on the behavior at a higher-frequency excitation.

An important feature of the present invention is the prevention of a transient effect of the low-frequency natural vibration of the assembly as the result of a rapidly occurring detuning of the assembly mount. While, according to the state of the art, low-frequency natural vibrations of the assembly as such are reduced, the process according to the invention provides the generating of targeted "interference pulses" which counteract the arising of a natural vibration of the assembly. The use of such interference pulses is particularly effective in the initial phase of a beginning natural vibration of the assembly.

The duration of the interference pulses is limited to no more than one fifth of the vibration duration of the natural vibration of the assembly. The pulse duration preferably amounts to approximately one tenth of the vibration duration of the natural vibration in order to not significantly change the acoustic characteristics of the assembly mount.

The "pulse amplitude" is also decisive. In order to achieve the effect according to the invention, a raising or lowering of the spring rate of the assembly mount by at least the factor 5 is required. Preferably, a spring rate ratio of approximately 1 to 10 is endeavored.

The change of the spring rate can take place in the sense of a hardening of the assembly mount as well as a reduction of its spring rate for the duration of the interference pulse. Preferably, a hardening of the mount takes place because, for an optimal insulation of the vibrations generated by the assembly, the assembly mount in its initial condition always has a low rigidity. The rigidity of the assembly mount can be changed, for example, by a magneto-rheological fluid, as described, for example, in German Patent Application 197 11 689.2.

The detuning continuously takes place at a frequency which is higher than or equal to the natural frequency of the non-detuned system consisting of the assembly, the mount and the base. As the result, it is ensured that at least one interference pulse occurs during each vibration period of the natural vibration of the assembly.

As the result of the process according to the present invention, the adjusting forces are minimized. In addition, this process prevents an intermediate storage of potential energy and a drifting of the zero position of the characteristic curve of the assembly mount.

As an alternative to the periodic detuning of the assembly mount as a function of the inherent vibration of the assembly, the mount can also be detuned periodically at the frequency of the vibrations generated by the assembly. As the result, the damping behavior of the aggregate mount is influenced as little as possible with respect to its actual lay-out.

It is particularly advantageous to increase the spring rate in the range of the zero crossings of the vibrations generated by the assembly in order to achieve a minimal reaction of the assembly mount to the surrounding structure and thus not significantly impair the acoustic qualities of the assembly mount, as would be the case in the event of a hardening of the mount at correspondingly high vibration amplitudes of the vibrations generated by the assembly.

The interference pulses may also be entered stochastically, in which case the density of the pulse sequence is to be dimensioned such that at least one interference pulse falls into almost every vibration period of the aggregate vibration.

In a preferred application of the invention, the assembly mount is constructed as an engine mount in a motor vehicle and, for insulating the free gas forces and inertial forces of the engine, as a rule of an internal-combustion engine, is constructed to be correspondingly soft. In addition to these engine-caused vibrations, the engine also carries out low-frequency movements (stuttering vibrations) with the natural frequency of the engine mount (approximately 5 to 15 Hz), which are the result, for example, of road excitations. By means of the process according to the invention for generating interference pulses, the arising of stuttering vibrations can be effectively counteracted.

For a period of detuning of the engine mount which is coupled to the rotational speed of the engine, sensors are provided on the drive assembly (engine and/or transmission) and sensors are provided on the body of the motor vehicle, which detect the acceleration values of the respective components. By means of the evaluation of the acceleration signals, stuttering movements of the drive assembly are detected and optionally a corresponding algorithm is started which detunes the assembly mount or mounts. In this case, the detuning preferably takes place periodically as a function of the rotational speed of the drive assembly (for example, coupled to the rotation of the crankshaft of the internal-combustion engine). However, in addition, a stochastic detuning can also be carried out.

Also, the process according to the invention can be used in an "anticipating" manner in that, during corresponding operating conditions of the vehicle, which lead to the expectation of the arising of stuttering vibrations with a certain probability, the assembly mounts are prophylactically detuned in a pulse-type manner.

The process last described by means of the drive assembly of a motor vehicle, can naturally also be used for other applications.

BRIEF DESCRIPTION OF THE DRAWINGS

In the following, the process according to the invention will be illustrated in the drawing by means of possible implementations and will be explained in detail.

DETAILED DESCRIPTION OF THE PREFERRED EMBODIMENT

Figure 1:
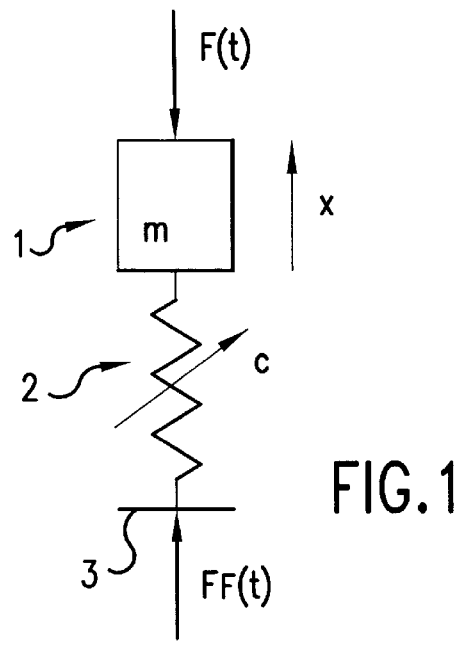
FIG. 1 is a schematic representation of an assembly which is disposed by means of a spring with a changeable spring rate.

FIG. 1 illustrates an assembly 1 with a mass m, which, by means of a mount 2 with a variable spring rate c, is linked to an environment 3. Because of the flexibility of the mount 2, the assembly 1 can carry out movements in the direction of the arrow x. The assembly 1, for example, the internal-combustion engine of a motor vehicle, generates a period force sequence (F(t). In addition, an outside force $F_F(t)$ acts upon the assembly 1.

Figure 2:
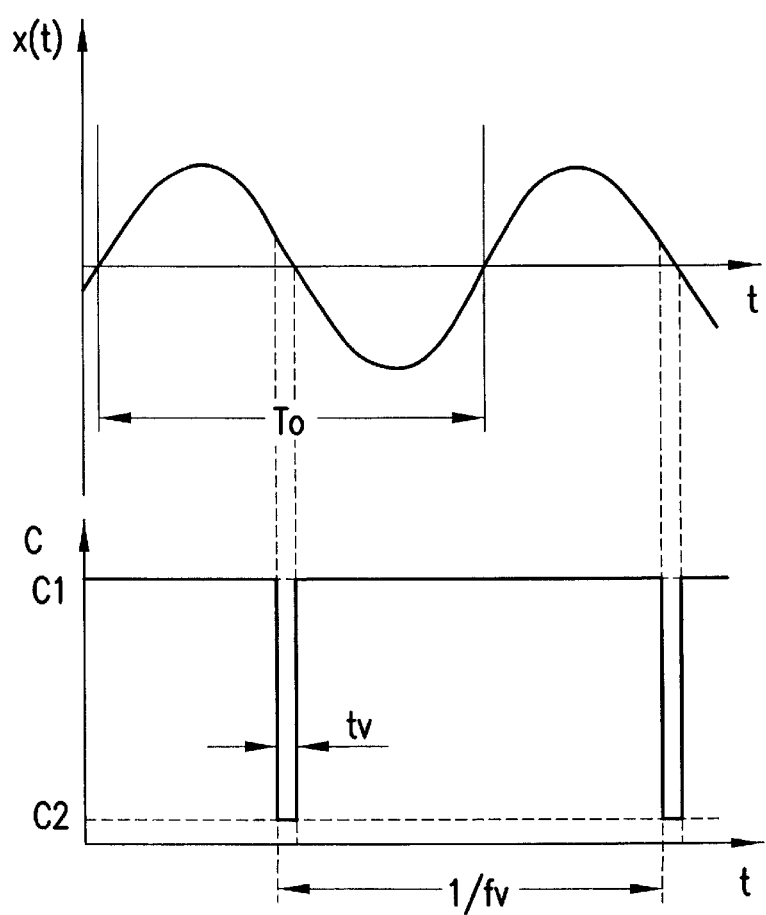
FIG. 2 is a view of the vibration sequence of the natural vibration of the assembly of FIG. 1 as well as the course of the spring rate of the mount of FIG. 1 coupled thereto with respect to the time.

FIG. 2 illustrates the course x (t) of the vibration movement which is generated by the force $F_F$. This is a vibration of the natural frequency $f_0=1/T_0$ of the system consisting of the assembly 1 and the elastic mount 2. According to the invention, the spring rate c of the mount 2 is periodically changed with the vibration of the assembly 1 such that in each case, for a short period of time $t_V$, the spring rate is reduced from its initial value $c_1$ to a value $c_2$. In this case, the adjusting duration $1_V$ amounts to approximately $0.1 \times 1/f_V$ (with $f_V=f_0$), at a ratio of the two spring rates $c_1/c_2$ of approximately 10/1. As illustrated in FIG. 2, the resetting of the assembly mount 2 in the "hard" direction takes place at the zero crossover of the vibration x(t) in order to minimize the adjusting forces.

Figure 3:
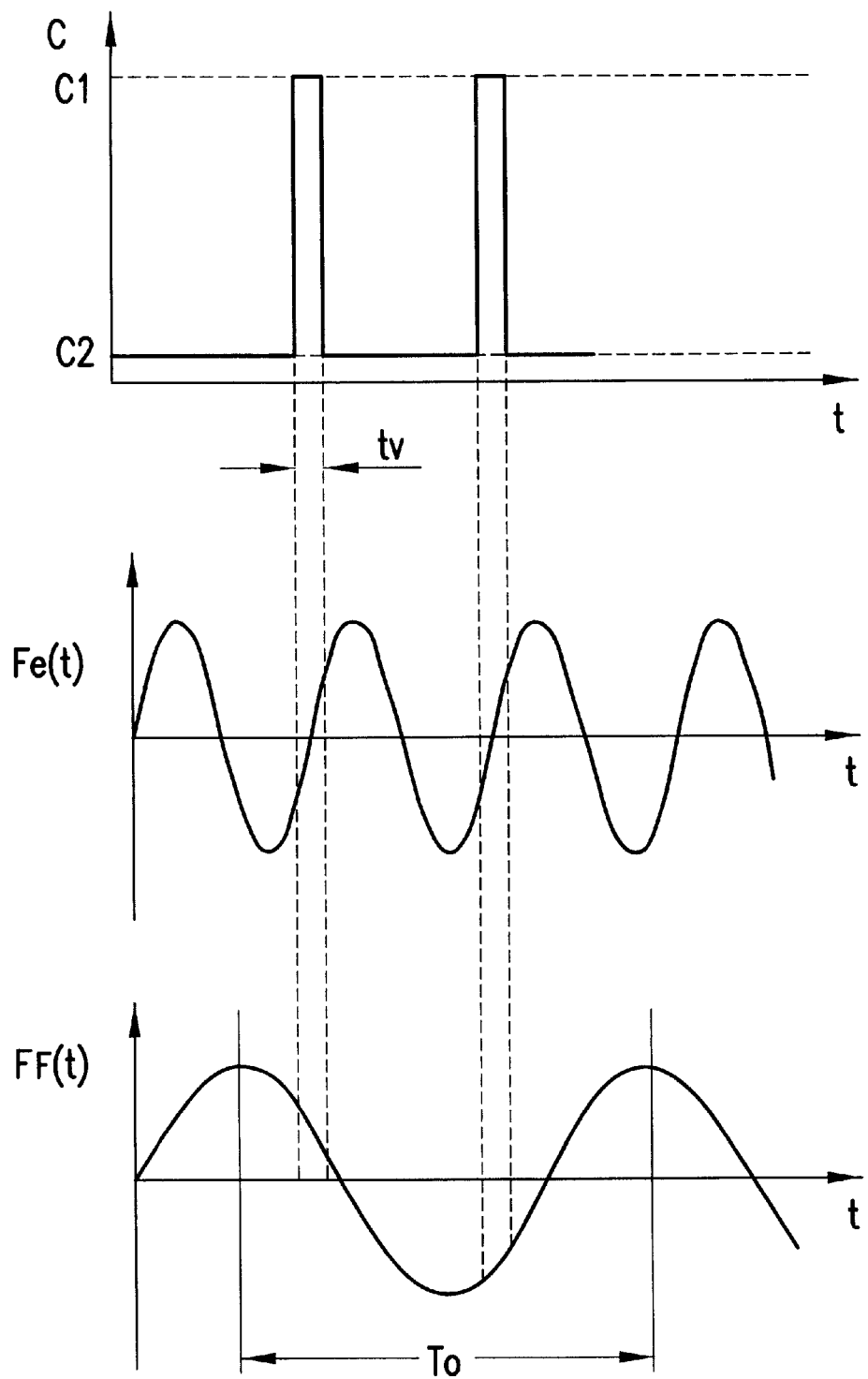
FIG. 3 is a representation corresponding to FIG. 2, the course of the vibrations generated by the assembly additionally being imaged.

As an alternative to the adjusting algorithm described in FIG. 2, according to FIG. 3, the detuning of the mount 2 is a function of the vibrations generated by the assembly 1. In this case, in the area of the zero crossovers of the vibrations generated by the assembly 1, an increase of the spring rigidity takes place from the initial value $c_2$ to the value $c_1$. As the result of the time-related position of the "interference pulses", it is ensured that the characteristics of the mount 2 with respect to its actual task—the suppression of the vibrations generated by the assembly—are not significantly impaired. The interference pulses take place periodically at respectively different points in time of the low-frequency natural vibration of the assembly 1.

Figure 4:
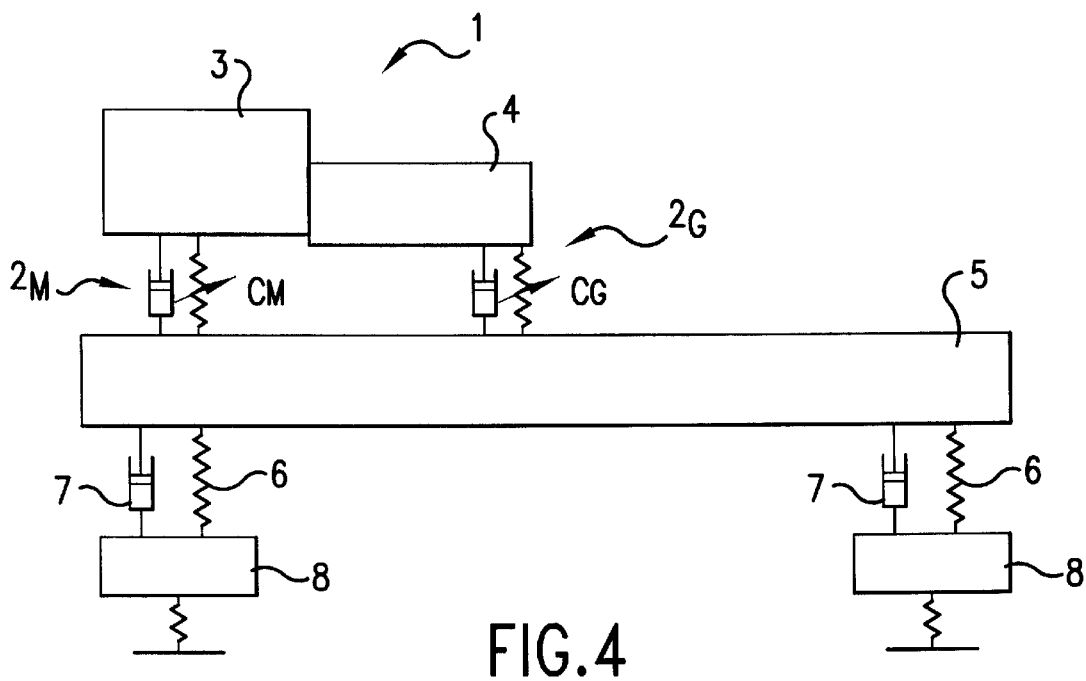
FIG. 4 is a schematic representation of the arrangement of the drive assembly in a motor vehicle.

FIG. 4 shows the mount of a drive assembly 1 which is composed of an engine 3 and a transmission 4. The drive assembly 1 is disposed by way of assembly mounts $2_M$ and $2_G$ with respect to a vehicle body 5. The vehicle body 5, in turn, is suspended by way of springs 6 and dampers 7 with respect to wheels 8. The assembly mounts $2_M$ and $2_G$ have a variable spring rate.

Figure 5:
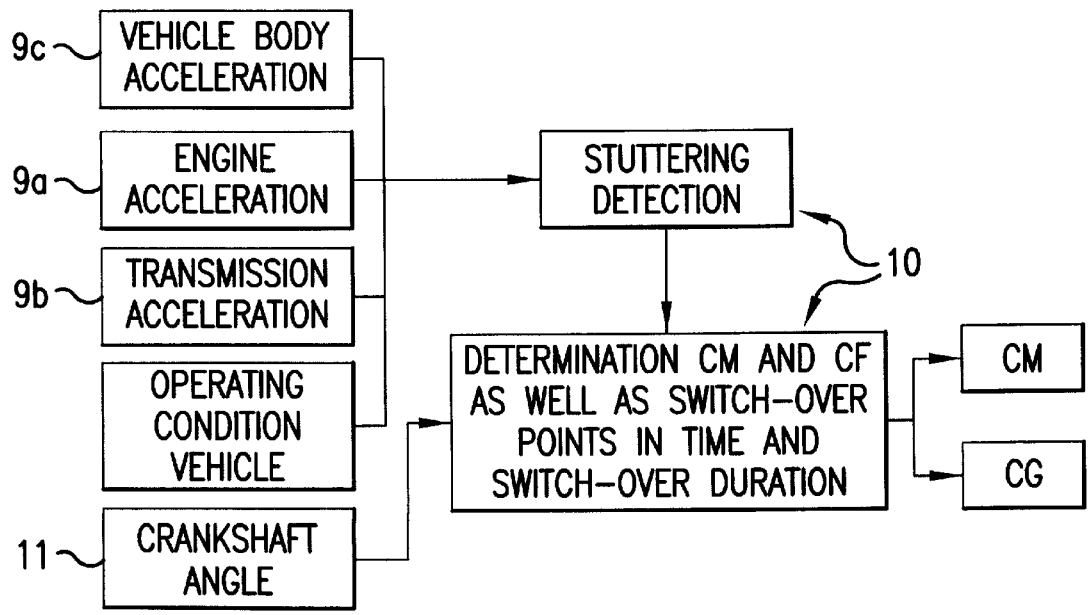
FIG. 5 is a block diagram for the controlling according to the invention of the mounts of the drive assembly of a motor vehicle.

FIG. 5 illustrates the algorithm for the pulse-type detuning of the assembly mounts $2_M$ and $2_G$. By way of acceleration sensors 9a to 9c, the vibrations of the engine 3, the transmission 4 and the vehicle body 5 are detected. Together with additional parameters, which allow the drawing of a conclusion on the operating condition of the motor vehicle (such as cornering, starting, braking, etc.), it is recognized in a control unit 10 whether a stuttering vibration of the drive assembly 2 is occurring. The control unit 10 will now control the assembly mounts $2_M$ and $2_G$ and change their spring rate $c_M$ and $c_G$. In this case, the switch-over points in time and the switch-over duration are determined. The pulse-type change of the spring rates $c_M$ and $c_G$ preferably takes place synchronously with the rotational speed of the engine 3, which is controlled by a corresponding pulse generator 11, for example, on the crankshaft.

What is claimed is:

1. Process for controlling a mount of an assembly whose spring rate is tuned to the suppression of the vibrations generated by the assembly and including a device for changing the spring rate, said process comprising the steps of;

changing said spring rate by at least a factor of five; and maintaining said changed rate during a time period that corresponds to no more than one fifth of a vibration duration ($T_0$) of the natural vibration of the assembly in order to prevent the transient effect of a low-frequency natural vibration of the assembly.

2. The process according to claim 1, wherein the step of changing said spring rate takes place periodically at a frequency ($f_0$) of the natural vibration of the assembly.

3. The process according to claim 2, wherein the changing the spring rate in a hard direction takes place at a zero crossover of the natural vibration of the assembly.

4. The process according to claim 1, wherein the change of the spring rate takes place periodically at the frequency of the vibrations generated by the assembly.

5. The process according to claim 4, wherein the spring rate is increased at each instance in the vicinity of zero crossovers of the vibrations generated by the assembly.

6. The process according to claim 1, wherein the change of the spring rate takes place stochastically.

7. The process according to claim 1, wherein the prevention of the transient effect of a low-frequency natural vibration takes place on a drive assembly of a motor vehicle.

8. The process according to claim 7, wherein the prevention of the transient effect of a low-frequency natural vibration is detected by means of acceleration sensors on said drive assembly and the body of the motor vehicle and wherein the step of changing the spring rate of the assembly takes place periodically as a function of the working cycle of the drive assembly.

9. Process for controlling a mount of an assembly whose spring rate is tuned to the suppression of the vibrations generated by the assembly and including a device for changing the spring rate, said process comprising the steps of;

changing said spring rate periodically at a frequency of the natural vibration of the assembly; and maintaining said changed rate during a time period that corresponds to no more than one fifth of a vibration duration ($T_0$) of the natural vibration of the assembly in order to prevent the transient effect of a low-frequency natural vibration of the assembly.

10. The process according to claim 9, wherein said spring rate is changed by a factor of at least five.

* * * * *